Sept. 28, 1971   H. J. BRUCKER   3,608,159

END CONNECTOR MEMBER

Filed May 5, 1970   3 Sheets-Sheet 1

INVENTOR
Henry J. Brucker
Shlesinger, Arkwright & Garvey
ATTORNEYS

Sept. 28, 1971   H. J. BRUCKER   3,608,159
END CONNECTOR MEMBER

Filed May 5, 1970   3 Sheets-Sheet 2

INVENTOR
Henry J. Brucker
ATTORNEYS

Sept. 28, 1971  H. J. BRUCKER  3,608,159
END CONNECTOR MEMBER
Filed May 5, 1970  3 Sheets-Sheet 3

INVENTOR
Henry J. Brucker
Klesinger, Arkwright & Garvey
ATTORNEYS

United States Patent Office 3,608,159
Patented Sept. 28, 1971

3,608,159
END CONNECTOR MEMBER
Henry J. Brucker, Summit, N.J., assignor to Suburban Metal Industries Limited, Scarborough, Ontario, Canada
Filed May 5, 1970, Ser. No. 34,664
Claims priority, application Canada, June 3, 1969, 53,359
Int. Cl. A44b *17/00;* A44c *5/18*
U.S. Cl. 24—201                                    10 Claims

ABSTRACT OF THE DISCLOSURE

The invention relates generally to material handling equipment and in particular to an end connector for releasably securing a cargo supporting or restraining strap to an anchor member mounted, for example, on the inside wall of a truck or other cargo container.

The end connector is in the form of a metallic or like plate to which the strap is fastened in any desirable manner, and an adjustable wire keeper is loosely mounted on the plate, the keeper adapted to securely releasably lock the end connector to the anchor member.

---

This invention relates to an apparatus for releasably securing cargo supporting or restraining straps to an anchor member and in particular is concerned with an improved end connector to securely releasably fasten a restraining strap to a wall anchor member.

In cargo transportation, webbing or straps are widely used to restrict undesired movement of the cargo in transit. In such use it is necessary that the straps be readily secured to anchor members, and quickly released for rapid removal of cargo at the destination. Enroute, the movement of the end connectors or fasteners necessarily must be restricted in order that the portion of the strap connector inserted in the wall anchor member or bracket will not be dislodged from the wall bracket in any manner. Any fastening means at the end of the straps should be of such construction as to satisfy these and other requirements.

Prior art suggests the use of various means of restricting the undesired movement of the inserted fastening means while the cargo is in transit. These means include the use of multi-plate devices, such plates being moveably fastened to one another to facilitate insertion into the wall brackets, such devices inevitably being of relatively complex design, and various single-plate devices which whilst being of simple design, are somewhat cumbersome to connect or loose fitting when connected. Inherent disadvantages of these and other means are therefore awkwardness of use and manufacture.

It is accordingly a principal object of the invention to provide a new and improved apparatus for releasably securing cargo restraining straps to anchor members such as built-in wall anchor members of transit vehicles and the like.

Another object is to provide such a device of simple design and manufacture, comprising a flat metallic or like end connector to which the restraining belt is fastened in any desirable manner, and an adjustable wire keeper loosely secured to the end connector and adapted to securely releasably lock the end connector to an anchor member.

Still further and more detailed objects of this invention will be in part obvious and in part made obvious herein below in connection with the following detailed description of the invention, reference being made to the accompanying drawings in which.

Figure 6:
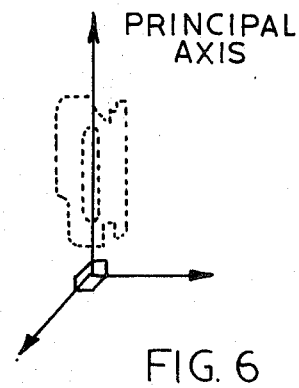
FIG. 6 shows the reference axes, in particular the principal axis.

With reference to the drawings, the strap end connector consists of a single plate 1 having a strap slot 3 extending parallel to the principal axis (FIG. 6), said axis being the normally vertical axis, of slightly larger length than that required to comfortably accommodate a restraining strip 2, said restraining strip 2 being drawn through slot 3 and fastened to itself in a standard manner.

Figure 3:
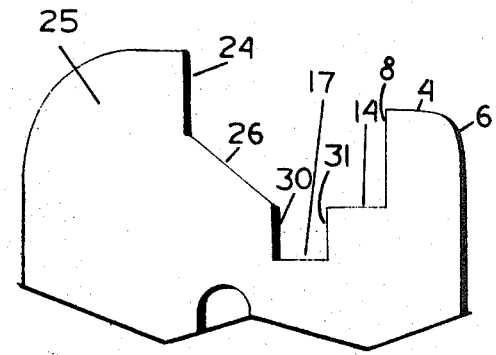
FIG. 3 is an enlarged cross-sectional view of the top and bottom ends of the connector as depicted in FIG. 2.
Figure 3:
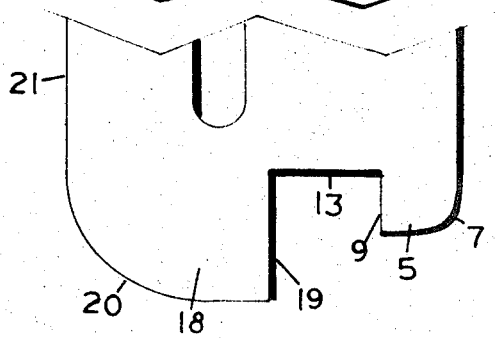
Figure 4:
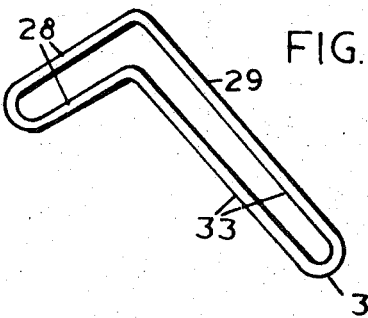
FIG. 4 is a perspective view of a wire keeper in accordance with the present invention as shown in FIG. 1.
Figure 5:
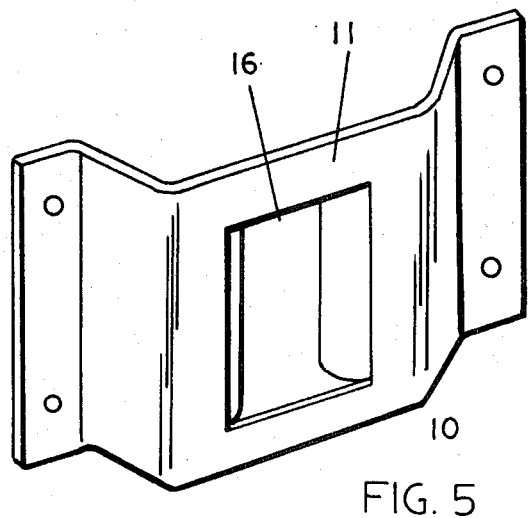
FIG. 5 is a perspective view of any suitable wall bracket or anchor member.
Figure 9:
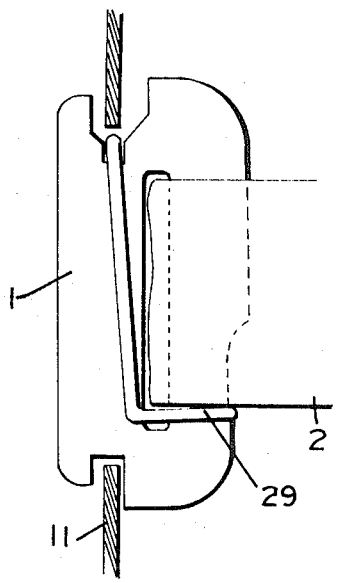
FIG. 9 is a side view of the strap end connector inserted in the anchor member, with the anchor member in section.

The plate 1 is provided with two lugs 4 and 5 projecting outwardly from that side of the plate 1 which is to be inserted into a wall anchor member 11, the outward edges 6 and 7 of said lugs 4 and 5 being inwardly curved as best seen in FIG. 3 and the inner edges 8 and 9 being parallel to the principal axis. The width of said lugs 4 and 5 is such that said inward edges 8 and 9 are aligned with each other. The lug 5 of the bottom end of the strap connector 1, in the preferred position as shown, forms one parallel side of an open-ended slot 12 of slightly greater width than that of a lower edge 10 of a wall anchor member 11 so as to loosely accommodate said edge 10 in the secured position (FIG. 9) allowing slight rotation of the connector 1 about its major axis during installation or disconnection. Slot 12 is of such a depth that the vertical distance between its inner end 13 and an edge 14 of an upper open-ended slot 15, is slightly greater than the vertical distance between the edges 10 and 16 of the member 11 as shown in the preferred position of FIG. 5.

The vertical height of an inner surface 9 of the lug 5 is such that the distance between the lowest point of lug 5 and an innermost surface 17 of the wire-keeper slot of the upper open-ended slot 15, said distance being the critical distance, is likewise slightly greater than the vertical distance along the principal axis between the aforementioned edges 10 and 16 of the member 11.

A shoulder extension 18 of the connector 1 comprises the other parallel side 19 of the open-ended slot 12, said shoulder portion having a curved outer surface 20 becoming linear along the principal axis forming an edge of the connector 1 normally covered by the restraining strap 2. The bottom portion 21 of said edge is indented with respect to the top portion 22 of said edge, said top portion 22 being a shoulder extension, so as to form a rounded projection 23 serving as a guide along which a wire keeper 29 may be manually formed upwards in operation.

An inner edge 24 of the shoulder extension 25 is parallel to the principal axis, and of a height at least the diameter of the wire keeper 29, thereby forming an abutment against which the wire keeper 29 comes to rest in operation. An inclined surface portion 26 of the open-ended slot 15 has a slope such that the wire keeper 29 readily slides out of a slot 27 when slight pressure is exerted on a handle section 28 of the wire keeper 29, or such that a minimum angle of inclination between the normally horizontal axis and the inclined surface is maintained.

The wire keeper slot 27, being a part of the entire slot 15, is a square open-ended slot having sides 30 and 31, parallel to each other and to the principal axis, of such height as to accommodate the wire keeper 29 in its rest position thereby preventing accidental insertion of the upper edge 16 of the anchor member 11 into slot 27 which would result in undesirable disconnection of the strap end connector 1 while in transit, said height being slightly less than the wire keeper diameter, and the bottom plane surface 17 having a width slightly greater than the wire keeper diameter.

Figures 7, 8:
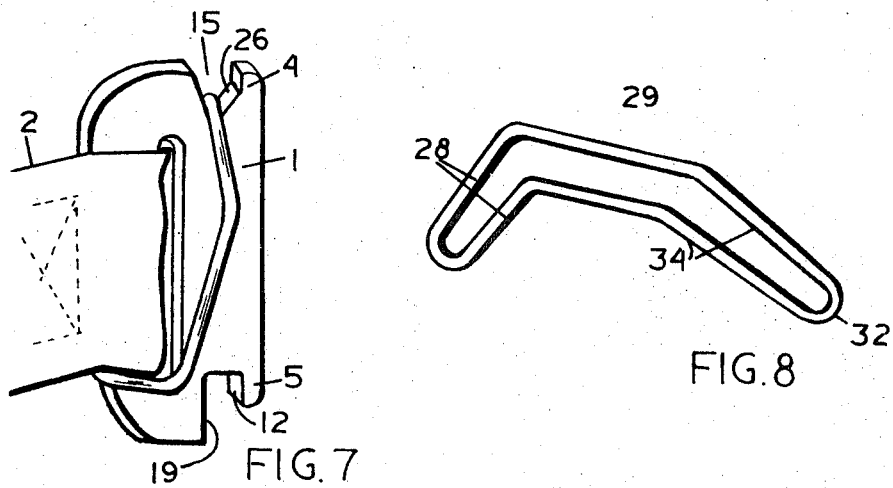
FIG. 7 is a perspective view of an alternative end-connector, in accordance with the present invention.
FIG. 8 is a perspective view of an alternative wire keeper, in accordance with the present invention.

One edge 31 of the slot 27, being in a vertical plane, and the aforementioned horizontal surface segment 14 of the upper open-ended slot 15, forms a projecting step (FIG. 3), the surface 14 being of such dimensions as to allow the wire keeper 29 to be upwardly removed from its slot 27, said dimensions having a width corresponding to that of the connector plate 1 and a length equal to or slightly greater than the width of the upper edge 16 of the wall anchor member 11. This step comprising sides 14 and 31 is omitted in an alternate design of the strap end connector as shown in FIG. 7.

The vertical height of the inner surface 8 of the lug 4 is such that the vertical distance between the tips of lugs 4 and 5, said tips being where inner surfaces 8 and 9 coincide with curved outer surfaces 6 and 7, is greater than the vertical distance between the edges 16 and 10 of the anchor member 11 so that the strap end connector 1 remains inserted during use of the restraining strap 2.

Moreover, the vertical height of said surface should be such that the tip 32 of the wire keeper 29 can at no time during insertion or release of the connector 1 be moved upwardly above this height, thus always loosely retaining the wire keeper tip 32 within the open-ended slot 15.

The wire keeper 29 is an L-shaped continuously joined band of metallic wire of small thickness relative to its length. The keeper 29 consisting of a handle end 28 and straight portions 33, being generally perpendicular to said end 28, narrowing to the tip 32, is mounted about the plate 1, the tip 32 normally resting within slot 27 when the connector 1 is neither being inserted nor released from the anchor member 11. An alternative design of wire keeper as shown in FIG. 8 has a slightly kinked portion 34 to assist in directing the keeper 29 during operation.

In operation, strap end connector 1 with wire keeper 29 mounted thereon, and restraining strap 2 being drawn through the strap slot 3 and fastened upon itself, is brought adjacent to the wall anchor member 11. While slight restraining force is exerted on shoulder extension 25, handle section 28 of the wire keeper 29 is pushed upwards resulting in the tip 32 of said keeper 29 being forced to rise out of the wire keeper slot 27 and slide along the inclined surface 26 of the upper open-ended slot 15, said slot shown in FIGS. 1 and 7, until further movement of the wire keeper tip 32 along the inclined surface 26 is prevented upon its abutment against side 8 of lug 4, vertical movement of the keeper being prevented by the engagement of the handle end thereof with the projection 23.

Figure 10:
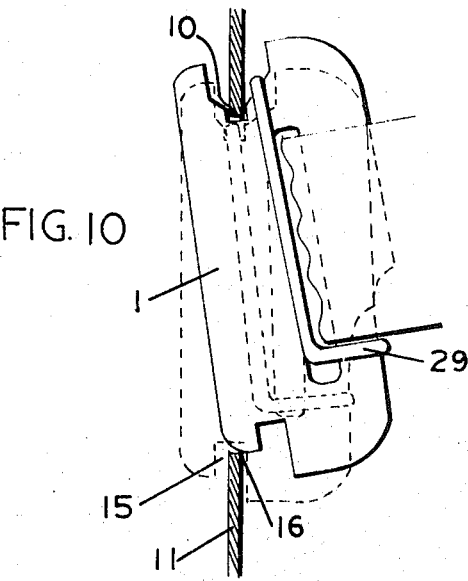
FIG. 10 is a view similar to FIG. 9 with the connector in the process of insertion into the anchor member.

In this position of the wire keeper 29, the lug 4 and adjacent wire keeper tip 32 are initially inserted at a slight angle to the principal axis, as shown in FIG. 10, into the wall anchor member 11 in such a manner that the edge 16 of the anchor member 11 is introduced into the open-ended slot 15, between the wire keeper 29 and the uninserted surface of the slot 15 as in FIG. 10, and, as the plate is continuously upwardly forced at the aforementioned slight angle, is subsequently introduced into the wire keeper slot 27. The insertion of the lug 4 and wire keeper tip 32 is continued until the bottom surface 17 of the wire keeper slot 27 comes into contact with the edge 16 of the anchor member 11, at which time, with the wire keeper handle 28 steadfastly maintained in its forced position, the plate is advanced towards the anchor member 11, until lug 5 is thereby inserted, and side 19 of the bottom open-ended slot 12 comes in contact with the outer surface of the anchor member 11, prohibiting further insertion of the connector 1.

The end connector 1 is then lowered such that the edge 10 of the member 11 is introduced into slot 12, and edge 16 of said member 11 is cleared of the wire keeper slot 27. The wire keeper handle 28 is released allowing the wire keeper 29 to assume its lower rest position, the tip portion 32 sliding downwardly along the inclined surface 26 of the slot 15 and coming to rest in its slot 27 thereby preventing further accidental introduction of the edge 16 of the anchor member 11 into slot 27, which could result in release of the strap end connector 1 from the wall anchor member 11. Release of the strap end connector 1 (as in FIG. 7) from the member 11 is effected, when desired, by exerting an upward force on the handle end 28 of the wire keeper 29, while concurrently forcing the connector against the member 11, resulting in the tip portion 32 of the keeper 29 forcefully sliding along the sloped surface 26 of the connector 1 upwards into the resulting void between the member 11 and the lug 4. The connector 1 is then raised until the tip of the bottom lug 5, which when extracted from the member 11, can be done so clear of edge 10 of said member. By raising and extracting the connector in such a manner, the edge 16 of said member 11 is introduced into the wire keeper slot 27 and the end connector 1 is slightly rotated about the principal axis such that it may be completely disconnected by a downward force. The wire keeper 29 is subsequently released to its rest position.

Figure 1:
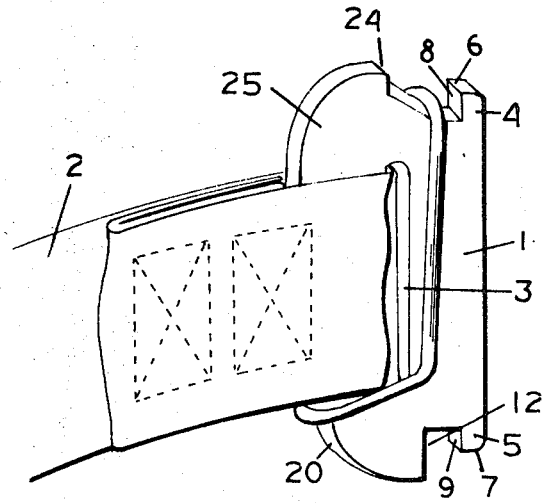
FIG. 1 is a perspective view of the end connector and wire keeper in accordance with the present invention.
Figure 2:
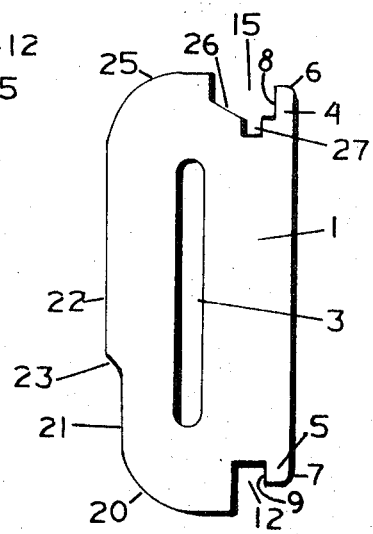
FIG. 2 is a side view of the end connector plate without the accompanying wire keeper.

Release of the strap end connector depicted in FIG. 1 is similarly effected, with the wire keeper tip 32 being upwardly forced along the sloped surface 26 while the connector 1 is pulled away from the member 11 in such a manner that the lugs 4 and 5 come into contact with the inner surface of said member. The connector 1 is then raised and disconnected as hereinabove described.

What is claimed is:

1. A connector member for removably attaching a strap or webbing to an anchor member formed with an elongated slot comprising a plate formed at opposite ends thereof with lugs adjacent that side of the plate which is to be inserted in the elongated slot of said anchor member, each of said lugs forming the outer side of an open-ended slot, the lower not being of slightly greater width than the lower edge of said elongated slot and as inner surface of the upper slot opposite the upper one of said lugs extending parallel to the outer side thereof for a distance from the top of the slot and then being inclined inwardly to a keeper slot which opens upwardly into the base surface of said upper slot and a keeper comprising a continuous loop of resilient material having a small cross-sectional area relative to its length, said keeper loosely mounted on said plate and movable relative thereto with one end of said keeper normally resting within said keeper slot and adapted to be moved out of said slot to permit engagement of said plate with said anchor member and, after engagement of said lugs with said elongated slot to be returned to its normal position with said one end in said keeper slot thereby to releasably secure the plate to the anchor member.

2. A fastener as claimed in claim 1 wherein said plate member has a slot extending parallel to its principal axis, said slot having a length greater than the width of the strap or webbing and adapted to accommodate said strap or webbing therein.

3. A fastener as claimed in claim 1 or 2 wherein the inward edges of said lugs are aligned with each other.

4. A fastener as claimed in claim 1 wherein the depth of said slots is such that the distance between the bases thereof is slightly greater than the distance between the upper and lower edges of said elongated slot.

5. A fastener as claimed in claim 1 or 4 wherein the distance between the base of said lower slot and the base of said keeper slot is slightly greater than the distance between the upper and lower edges of said elongated slot.

6. A fastener as claimed in claim 1 wherein said inclined inner surface of said upper slot has a gradient such that the keeper may be readily moved out of keeper slot and along said inclined inner surface upon application of slight pressure to the keeper.

7. A fastener as claimed in claim 6 wherein the top part of said inner surface of said upper slot and which extends parallel to the outer side of the upper lug forms an abutment preventing movement of said keeper completely out of said upper slot.

8. A fastener as claimed in claim 6 wherein said keeper comprises a continuous loop of metallic wire.

9. A fastener as claimed in claim 8 wherein said keeper is generally L-shaped and comprises a handle end and straight portions extending generally at right angles to said handle end but converging slightly to a tip end opposite said handle end.

10. A fastener as claimed in claim 8 or 9 wherein the height and width of said keeper slot are slightly greater than the diameter of said wire.

References Cited
UNITED STATES PATENTS

| | | | |
|---|---|---|---|
| 3,404,438 | 10/1968 | Goldman | 24—201A |
| 3,439,390 | 4/1969 | Prete | 24—265CTD |

BERNARD A. GELAK, Primary Examiner

U.S. Cl. X.R.

24—265